July 28, 1953 — E. F. RUSCH — 2,646,834
REMOVABLE TIRE CLEAT
Filed Jan. 28, 1950 — 2 Sheets-Sheet 1
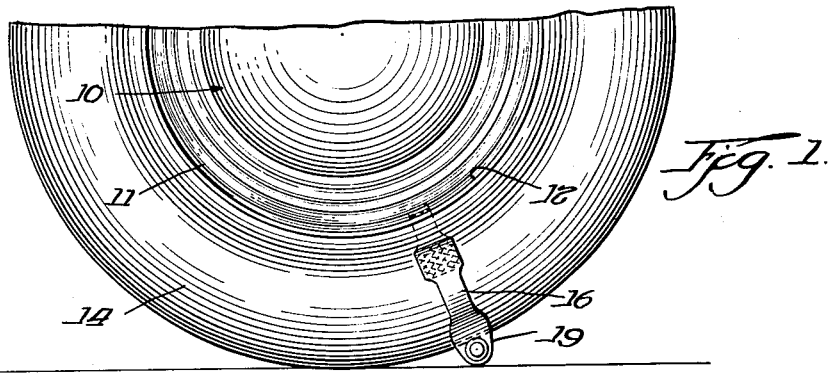
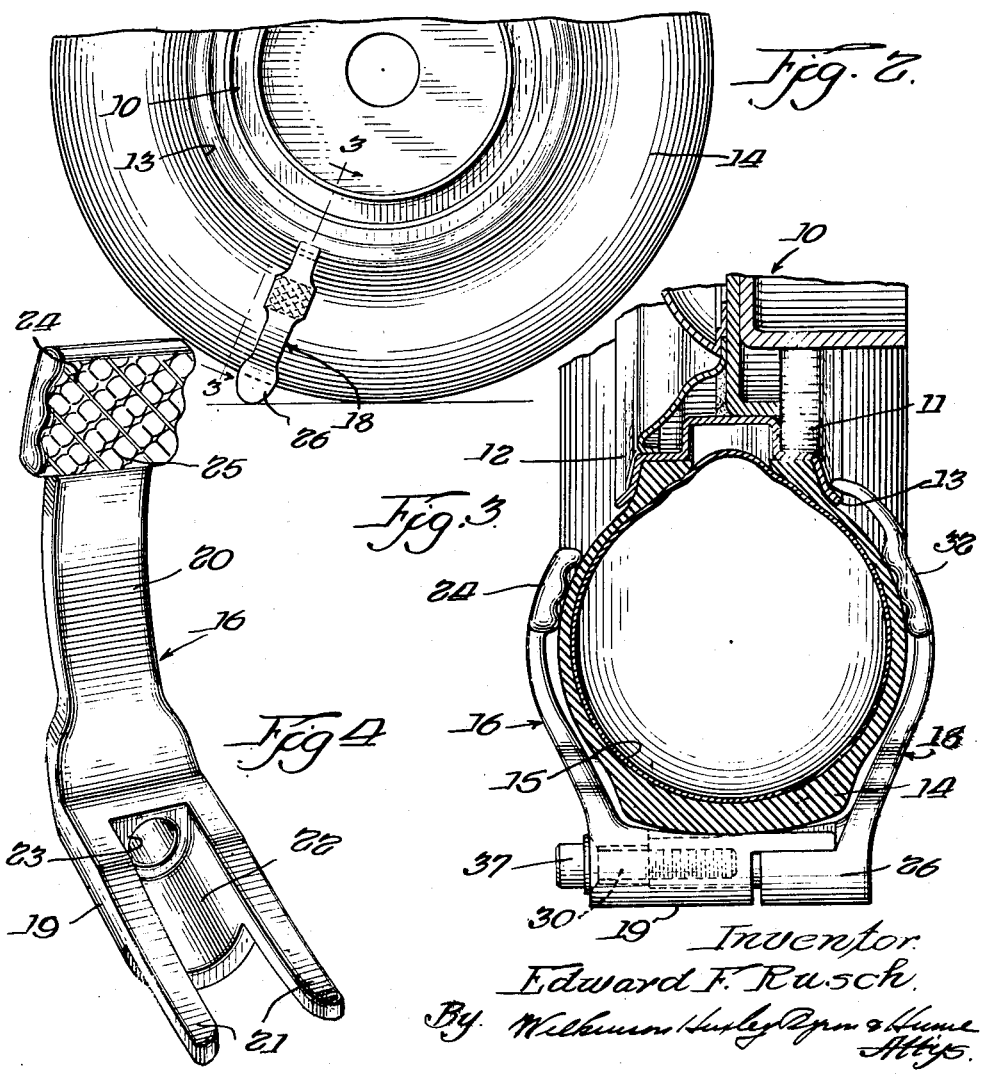
Inventor
Edward F. Rusch July 28, 1953  E. F. RUSCH  2,646,834
REMOVABLE TIRE CLEAT
Filed Jan. 28, 1950  2 Sheets-Sheet 2
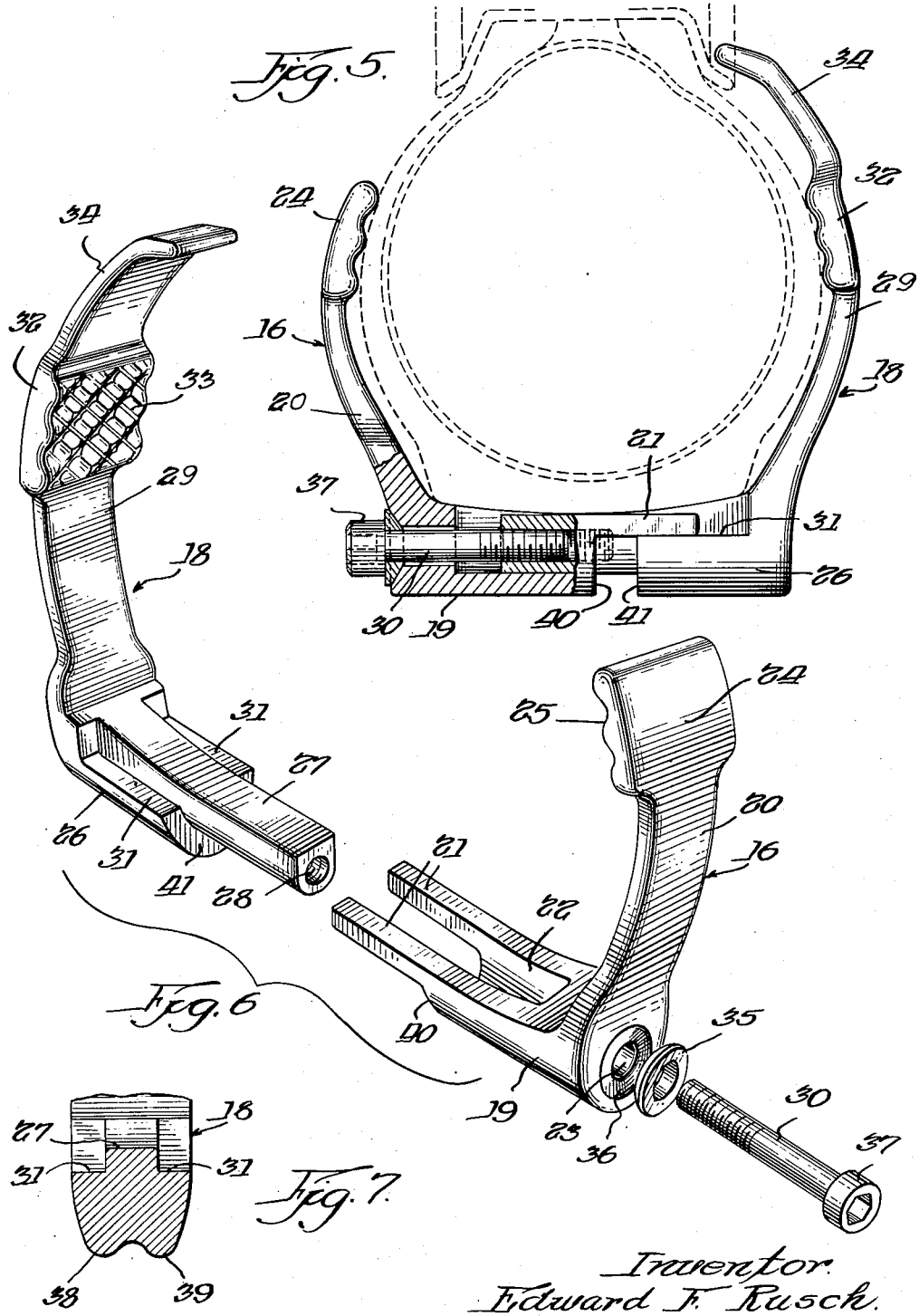
Inventor
Edward F. Rusch.

Patented July 28, 1953

UNITED STATES PATENT OFFICE 2,646,834

REMOVABLE TIRE CLEAT

Edward F. Rusch, Cicero, Ill.

Application January 28, 1950, Serial No. 141,053

2 Claims. (Cl. 152—225)

The invention relates to tire cleats and has reference more particularly to an improved tire cleat that can be readily and securely attached to a tire on a vehicle and just as easily removed after the cleat has served its purpose.

The cleat of the invention is adapted to be fixed to a tire or wheel of an automobile, truck, tractor, airplane or similar engine driven vehicle in order to provide positive traction for pulling the vehicle out of soft ground and from ditches or from off-the-road locations where non-skid surfaces on the tires such as provided by chains or the like are an absolute requirement.

The tire cleat is therefore designed for temporary use when conditions such as above stated are encountered and can be readily affixed to a tire with one member or leg of the cleat having contact with the rim of the wheel.

An object of the invention is to provide a tire cleat of rugged and durable construction which can be easily attached to a tire in operative position and just as readily removed and which will not damage or weaken the tire at the location of the cleat.

Another object is to provide a tire cleat of two-part separable construction preferably formed of metal for adequate strength and which is provided with an arcuate leg member as regards each separable part adapted to contact the side walls of the tire for clamping action therewith.

A further object is to provide a separable two-part tire cleat wherein each part is formed with a base of special formation and construction to enable the parts to interfit in a manner that requires only a single screw for holding the parts in assembled operative relation.

A still further object resides in the provision of a two-part releasable tire cleat of rugged and durable construction that can be economically manufactured and which will be entirely satisfactory in service.

With these and various other objects in view, the invention may consist of certain novel features of construction and operation as will be more fully described and particularly pointed out in the specification, drawings and claims appended hereto.

In the drawings which illustrate an embodiment of the invention, and wherein like reference characters are used to designate like parts—

Figure 1 is an elevational view of a tire with the tire cleat of the invention affixed in operative position;

Figure 2 is a view similar to Figure 1 but showing the inside wall of the tire and illustrating the manner in which one leg of the clamp has engagement with the wheel;

Figure 3 is a cross-sectional view along line 3—3 of Figure 2 illustrating the gripping action of the present tire cleat;

Figure 4 is a perspective view of one leg member of the present tire cleat;

Figure 5 is a sectional view illustrating the manner in which the two leg members of the tire cleat are bolted together in operative position on the tire;

Figure 6 is a perspective view showing the elements of the present cleat in separated relation; and Figure 7 is a cross-sectional view of a modified form of tire cleat.

The tire cleat of the invention is adapted to be releasably secured to a wheel having a pneumatic tire such as the automobile wheel 10, as shown in Figures 1 and 2, the same essentially consisting of rim 11 having an outwardly directed flange 12 on one side of the wheel and an outwardly directed flange 13 on the opposite side of the wheel. The rubber tire 14 of conventional construction is held to the wheel 10 by means of the interfitting relation which the tire has with the rim 11. The inner tube 15 is located within the tire casing 14 and the structure is inflated as is well known in the art.

The tire cleat essentially consists of a pair of members 16 and 18, each member being approximately L-shaped in form and having a base portion and an arcuate leg portion. The member 16 which is disposed on the outside of the tire, as will be clearly understood from an inspection of Figures 1 and 3, consists of a base portion 19 and a leg portion 20. The base portion is bifurcated to form the spaced prongs 21 and said base between the prongs is provided with the open recess or channel 22. The base portion 19 where it joins with the leg 20 comprises a relatively heavy section and which is bored to form the longitudinally extending opening 23, the same communicating with recess 22 and comprising substantially a continuation of the recess. The leg portion 20 of member 16 is bowed outwardly to a slight extent and the said leg portion terminates at its upper end in a section 24 which is slightly wider and thicker than the connecting part of the leg portion. The section 24 has a knurled or serrated surface 25 disposed inwardly or in a direction facing the prongs 21. The section 24 provides a gripping surface and which is adapted to have contact with a side wall of the tire when the members are in assembled relation on the tire. The serrated or knurled surface 25 of the section may be roughened in any suitable manner and as shown in the drawings the same essentially consists of corrugations extending diagonally and which criss-cross the inside surface of the section.

The member 18 is adapted to be located on the inside of the tire and this member is characterized by an extention which has contact with the flange 13 of the rim 11. The base portion 26 and leg portion 29 comprise the member and, as best shown in Figure 6, the said base portion is provided with a central projecting finger 27 adapted to fit between the prongs 21 and have location within recess 22 when the base portions of the members are assembled. The finger 27 has a bore 28 centrally of the same and which extends longitudinally, being threaded for receiving the securing bolt 30. The base 26 is provided with a ledge or flange 31 on each side of finger 27 and the prongs 21 are received by said flanges when the base portions are assembled. The leg portion 29 is bowed outwardly and said portion intermediate its length is provided with a serrated section 32 having a roughened or knurled surface 33 and which section is similar in all respects to its companion section 24 on member 16. The extension 34 which projects beyond section 32 is adapted to engage flange 13 of the rim 11 of the wheel and this engagement of the extension with one flange of the rim in combination with the gripping action which the serrated sections have with the tire, effectively holds the tire cleat in operative position on the tire and acts to prevent slipping of the same even under the most severe usage.

The present tire cleat is relatively simple in construction although the parts are rugged and durable and are designed for economy in manufacture. The separable two-part cleat can be readily applied to the tire and just as easily removed. In assembling the article in operative position on a wheel equipped with a pneumatic tire the member 18 is preferably located on the inside of the tire so that the extension 34 of this member may contact with the rim during operation as shown in Figures 1 and 2. Member 16 is then disposed on the outside of the tire and the base portions of the two members are interfitted by locating finger 27 between prongs 21, said finger naturally assuming a location within recess 22, and the prongs having location on flanges 31. The manner in which the members interfit along their base portions renders it possible to secure the members in assembled relation by means of a single securing bolt 30. The bolt 30 may be provided with the washer 35 which has location in the bevelled opening 36 formed on the base portion 19 in the vicinity of the bored opening 23. The bolt 30 is inserted in said opening until it seats in the threaded opening 28 of finger 27. The bolt is now turned by locating a tool in the socketed head 37 and said rotation is continued until the parts are secured together so as to have a firm gripping relation with the tire.

The exterior surface of the base portions may be rounded, as shown in Figures 1 to 6 of the drawings, it being clearly understood that the base portions provide the additional gripping element for the tire which gives the necessary positive traction for pulling the vehicle out of soft ground and from ditches or from off-the-road locations. For improved traction the rounded surfaces of the base portions could be knurled, serrated, or formed as shown in Figure 7, wherein two protuberances are provided indicated by numerals 38 and 39.

Base portion 19 is provided with a shoulder 40 from which the prongs 21 extend, whereas base portion 26 is provided with a shoulder 41, the finger extending outwardly from said shoulder. In Figure 3 the tire cleat is shown in associated relation with a tire and which is of such size that the base portions are drawn together to the extent where the shoulders almost contact. In Figure 5 the cleat has been applied to a tire of slightly larger diameter and in this case it will be noted that the shoulders have a slightly larger spacing between them. In both cases it will be found that the cleat is securely attached to the wheel in gripping relation with its tire and which position will be maintained even under the most severe usage in propelling the vehicle out of difficult situations.

The invention is not to be limited to or by details of construction of the particular embodiment thereof illustrated by the drawings as various other forms of the device will of course be apparent to those skilled in the art without departing from the spirit of the invention or the scope of the claims.

What is claimed is:

1. In a tire cleat, in combination, a pair of members approximately L-shaped in form and adapted to be releasably secured together in encircling relation with a pneumatic tire, each L-shaped member having a base portion of relatively heavy section adapted to engage the tread portion of the tire and said members each having a leg portion that is bowed outwardly for location adjacent the side walls of the tire, the base portion of one member being bifurcated to provide spaced prongs and a recess located between the prongs at the base thereof, the base portion of the other member providing a central finger and a supporting flange on each side located at the base of the finger, whereby the base portions have interfitting relation with the finger having location in the recess and the prongs being disposed in contact with and being supported by the flanges respectively, and threaded means for releasably securing the base portions in interfitting relation.

2. In a tire cleat, in combination, a pair of members approximately L-shaped in form and adapted to be releasably secured together in encircling relation with a pneumatic tire, each L-shaped member having a base portion of relatively heavy section adapted to engage the tread portion of the tire and said members each having a leg portion that is bowed outwardly for location adjacent the side walls of the tire, the base portion of one member being bifurcated to provide spaced prongs and a recess located between the prongs at the base thereof, the base portion of the other member providing a central finger and a supporting flange on each side located at the base of the finger, whereby the base portions have interfitting relation with the finger having location in the recess and the prongs being disposed in contact with and being supported by the flanges respectively, threaded means for releasably securing the base portions in interfitting relation, each leg portion having a serrated section adapted to contact a side wall of the tire when the members are in assembled relation, and an extension on one of said leg portions projecting beyond its serrated section for contact with the rim of the wheel.

EDWARD F. RUSCH.

References Cited in the file of this patent

UNITED STATES PATENTS

| Number | Name | Date |
| --- | --- | --- |
| 1,226,358 | Nace | May 15, 1917 |
| 2,343,131 | Austin | Feb. 29, 1944 |
| 2,474,262 | Linderme | June 28, 1949 |
| 2,507,090 | Brown | May 9, 1950 |
| 2,524,973 | Hammond | Oct. 10, 1950 |